UNITED STATES PATENT OFFICE.

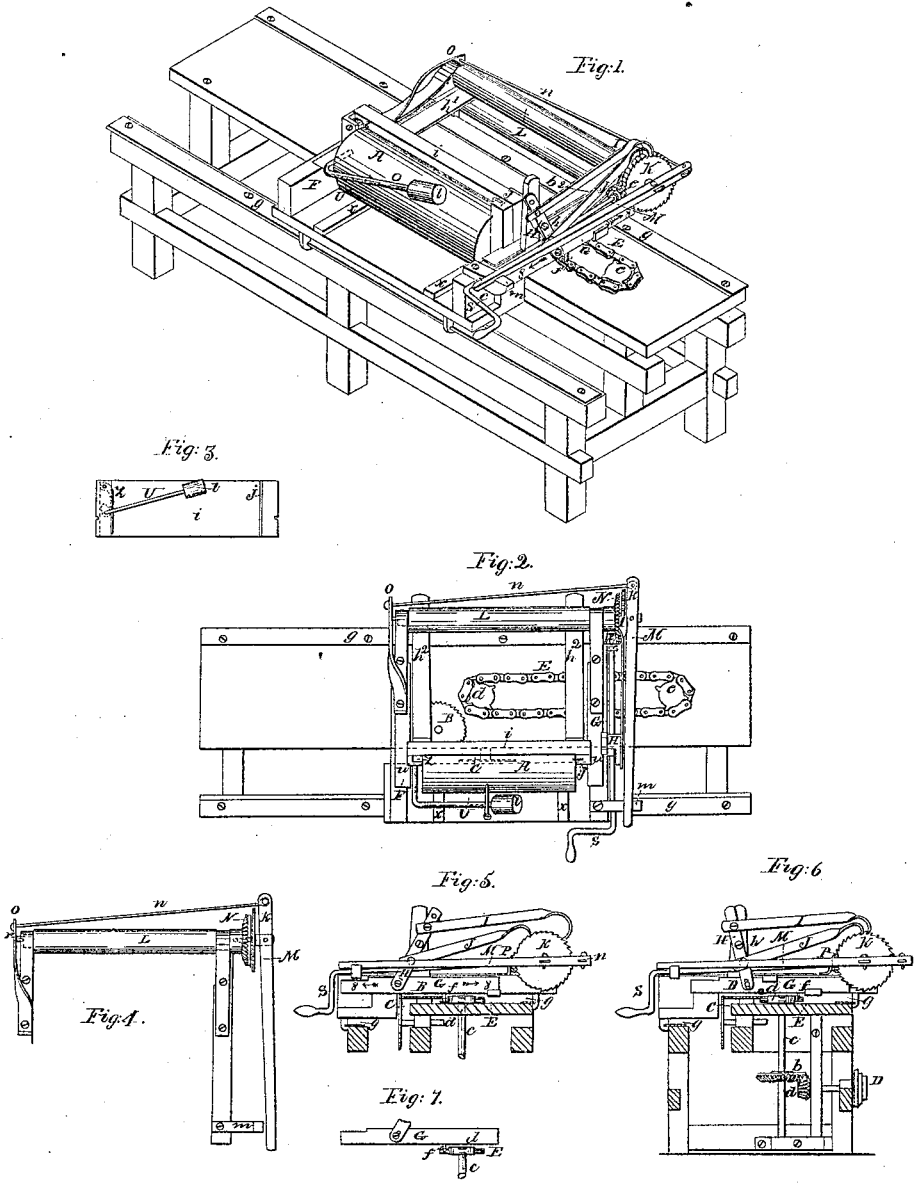
T. J. Alexander,
Circular Saw Mill,
No 19,536.
Patented Mar. 9, 1858.

THOS. J. ALEXANDER, OF WESTERVILLE, OHIO.

SAWING-MACHINE.

Specification of Letters Patent No. 19,536, dated March 9, 1858.

*To all whom it may concern:*

Be it known that I, THOMAS J. ALEXANDER, of Westerville, in the county of Franklin and State of Ohio, have invented a certain new and useful Improvement in Arrangements for Effecting and Regulating the Cross Feed or Set in Sawing-Machines, of which the following is a full, clear, and exact description, reference being had to the accompanying drawing, which forms part of this specification, and in which—

Figure 1 represents an isometrical perspective of a sawing machine with my improvement applied thereto; Fig. 2, a plan of the top portion of the machine; Fig. 3, a front view of the slab holding beam with the appliances for securing the slab thereto; Fig. 4, a top view of the cross feeding roller with its supporting and controlling appurtenances; Fig. 5, a vertical cross section through the machine in part, in illustration of the feed works; Fig. 6, a similar (fuller) view, showing the catches which operate the ratchet in a back or reverse position to that occupied by them in Fig. 5, and Fig. 7 represents a side view of the cross feed operating slide with the driving pin in gear with the endless chain that gives the reciprocating feed to the slab carriage, also showing one of the end chain pulleys.

My present improvement has reference to the setting up or adjustment, in regular or appointed order, and controlling of the stuff to be sawed (supposing the saw or saws to have a fixed relationship and the stuff to reciprocate) in machines which, by a succession of cuts, cut up a log or slab, say, into a series of laths, planks, strips or sticks.

In the machine represented in the accompanying drawing, the arrangement is represented as applied to cutting up a slab (A) into laths, by the reciprocating travel of the slab against and past circular saws (B C), the one (B) of which occupies a horizontal position, and the other saw (C) a vertical one, the two saws being arranged preferably near each other and their lines of action being so disposed that the two saws combined cut a lath of a certain width and thickness out of the traveling slab, or a series of laths by employing more than the one vertical (say) saw, as is well understood in machines of this class, and as explained in the machine described in Letters Patent of the United States granted to me September 20th 1853.

Revolving motion may be communicated to the saws (B C) in any suitable manner, and the longitudinal feeding and cross setting devices of the slab may be operated from the horizontal saw mandrel, by belt passing from said mandrel over a pulley in the end of the machine, the shaft of which pulley may carry a grooved pulley corresponding with and driving, by cord or belt, the grooved pulley (D) on the back of the machine, said grooved pulleys being constructed so as to admit of varying the velocity to the feed works, which they serve to drive. This last named pulley (D) carries, on its shaft, a bevel wheel (*a*), that gears into and drives a further bevel wheel (*b*), which is keyed fast to a vertical shaft (*c*), that carries at its top end, say, a chain pulley (*d*), around which and around another chain pulley (*e*), at a suitable distance from each other, is passed a pitched chain (E), that serves, in connection with a pin (*f*) attached to one of its links, to give a reciprocating travel, as the chain continues in motion, to the traveling carriage (F) which carries the slab to be sawed. This chain (E) occupies a horizontal position and operates over the upper side of the timber that supports the ways (*g g*) along which the slab carriage moves and is guided. About such mode of feeding or reciprocating the carriage, to wit: by endless chain and pin, producing, what has been termed, an elongated crank movement, there is of course nothing new in the abstract, as the same is common to planing and other machines; but it is to the manner of operating the cross feed works that I desire, here, to call attention.

The pin (*f*), which gears the chain with the slab carriage, is not connected direct to the carriage frame proper, but to a cross slide (G) which, while it reciprocates with and may be said to form a portion of the slab carriage (F), has a motion independent of and at right angles to the travel of the whole carriage, (as indicated by arrows 8, 8, in Figs. 1 and 5). This right angled movement is not merely for the purpose of allowing the pin (*f*) to turn around the chain pulleys without straining on the carriage to divert it from its regular path, during the travel of the endless chain; but, when the feed driving pin (*f*) is so turning, and, at such period only, giving the slide (G) its independent cross movement, it is made to perform a further function, namely, that of giving the cross set or feed to the slab, at or about the end of the carriage stroke, for the performance of a new cut or return feed of the slab to the saws, by the attachment to the slide (G) of a lever (H) whose fulcrum (*h*) may be intermediate of its length, and, on opposite sides of which fulcrum, pawls or catches ( I, J,) are pivoted, preferably, adjustably so in order to vary the stroke of the catches when desired. These catches (I J) gear with and serve to operate a ratchet wheel (K) whose office it is to turn, at intervals, a top feed roller (L) that bites on legs ($h^1$, $h^2$,) of a cross sliding beam (*i*) which forms part of the carriage and which carries the slab (A). This action forms the cross feed or set of the slab. The catches (I J) being on opposite sides of the fulcrum of the lever (H), they of course alternately serve, the one at one end of the carriage stroke and the other at the other end, to work the feed ratchet wheel (K), and the one catch goes forward to get proper grip for the next feed while the other catch is feeding, the cross feed in such case taking place at both ends of the carriage stroke to secure a cut in both directions of the reciprocating carriage travel, as, it is obvious, the machine may be constructed to cut in both directions of travel, but, where only designed to cut in one direction of the travel, then a single catch or pawl only may be used. Two ratchet wheels arranged side by side may be used when the work is heavy and there is not room for both catches to work on the one wheel.

The slab (A) is shown as held to the beam (*i*) by a chisel projection (*j*) at the one end, and by a cam or cam acting on a arm or swinging piece (*z*) pinching against the slab at the other end, the cam being attached to the bent arm of a lever (U) which carries a weight (*l*).

The cross feed ratchet wheel (K) is not here shown fast to the roller (L) which gives the cross feed or set to the slab, but is disconnected from it, that is, it is loose on the central pin which passe through it into the end of the upper roller (L) and the outer end of said pin made flat and pivoted to a lever (M) connected with the slab carriage, and the office of which lever is, accordingly as it is operated, to bear the flat inner face of the ratchet wheel (K) against the flat back of a bevel wheel (N) fast to the upper roller (L), and so cause the ratchet wheel to drive the roller by the friction of the two wheels (K and N) against each other, to increase which friction and perfect the bite, a little powdered resin between the wheels may be used if desired; or, by pressing the lever (M) in the opposite direction, the arrangement serves to relieve the bite, so that the ratchet wheel may be moved without working the roller. The front end of this lever fits, at pleasure, into a notch (*m*), to hold the ratchet and bevel wheels (K, N) in tight contact, to operate the roller when the ratchet is moved; while the release of this lever from its notch frees said gear of the wheels or ratchet and roller. The back end of said lever (M) is pivoted to a rod (*n*) running across the back of the carriage, and jointed, at its one end, to a lever or spring bar (*o*) which fits against a center point (*r*) in the end of the roller farthest from the ratchet gear. This arrangement, while it secures the ratchet wheel driving the roller by frictional contact with the bevel wheel (N), when desired, enables the roller (L) to be otherwise turned, or driven, as if there were no such frictional bite. The bevel wheel (N), on the roller, gears into a bevel pinion (P) which is worked by hand, at front of the machine, by means of a crank (*s*) on the end of the pinion's shaft; the use of which will be seen in the following brief description of the operation of the machine.

The friction being broken between the ratchet wheel (K) and roller wheel (N) by the release of the lever (M) from its notch (*m*), the operator turns the crank (*s*) and, by the gear of the pinion (P) and wheel $(N)_4$ runs forward the slab (A) till the beam (*i*), or its adjuncts, strike stops (*u u*) projecting from the carriage frame. This adjustment forward of the slab determines, say, the thickness of the first lath. The operator then, by his hand moving the weighted lever (U), loosens the pressure of the cam which bears up the slab at its one end, and drops or forces down the slab on to ways (*x x*), which determine the width of the lath to be cut. When the slab is thus adjusted, it is fastened by means of the cam on the arm of the weighted lever (U) being made to reëstablish the hold of the slab, and the carriage fed forward by the action of the devices already described, and, as the slab is being cut, the friction is established between the ratchet wheel (K) and roller wheel (N), by throwing the lever (M) into its notch (*m*), whereby, on the chain driving pin (*f*) rounding the chain pulley, the first automatic cross set of the slab, through the action of the one catch (I or J) on the ratchet wheel (K), is produced, for the cutting of another lath from the slab; and, thus adjusted, the automatic cross feed continues until the last lath in the tier is cut, or rather until while the last cut in the tier is being made, when the friction of the ratchet and roller wheels is again broken, and, as soon as the last cut is made, the operator turns, with his one hand, the crank (s), to bring forward the slab to its adjustment by the stops (u, u,) again, and, with his other hand, releases the cam grip of the slab, to let the slab down on to the ways (x x), when, by pressing down or leaving loose of the weighted lever (U), he again secures the slab for a repetition of another series of cuts forming the second tier, and so on till the slab is cut up into laths. Now, it will be seen that, in this automatic cross feed of the slab from time to time, not only is the timely cross set of the slab established, with the greatest precision, relatively to the reciprocating feed of the whole carriage, by reason of the one driving device or pin (f) serving to drive the carriage and actuate the slide (G) which operates the catches (I J) that gear with the ratchet wheel (K); but also that there is no jerking or sudden stopping of the cross setting motion, and the slab is gently set in motion and its momentum as gradually arrested, the catches (I J) moving slowly at first and as slowly stopping as the driving pin (f), in rounding the chain pulleys, leaves its straight line of travel on the one side of the one chain pulley and arrives at the point which commences its other straight line of travel on the opposite side of the same pulley; and thus the work is eased, liability to breakage reduced, and the ratchet wheel (momentum being gradually checked) prevented exceeding its proper stroke each time, while the easy intermittent reciprocating action of the slide (G), which in one sense may be said to drive both the carriage and give the cross feed to the slab, does away with much or all angular strainage or twisting of the carriage, and an easy continuous feed of the carriage may be kept up. Further, it will be seen from the foregoing description that, the automatic cross feed can be stopped with ease almost instantaneously, and that it can be done at any time, even when the catch (I or J) is on a strain, which is not the case under the ordinary method of operation of throwing the catches out of gear with the ratchet wheel; while as, in the arrangement here shown, the catches are always in gear whether the ratchet wheel (K) is in frictional bite with the roller wheel to produce feed, or not, the first and each subsequent automatic cross feed of the slab is of necessity made correct, to insure the cutting of laths of equal thickness, without trouble to the operator as regards adjustment of the first automatic cross set, for the operating pawl or catch is ever snug up to the tooth in the ratchet wheel it is designed to pull on, which cannot be made certain or even probable where the ratchet wheel is fast to the feed roller and the catches are thrown out of gear for the purpose of effecting the first or occasional hand adjustment of the slab up to the stops (u, u), say, as in throwing the catches into gear again, it is scarcely to be expected that they would drop into snug contact with the ratchet wheel so as to start the latter immediately upon the catches moving again, and, unless they do so, a certain portion of their feeding stroke would be lost and the slab thereby gaged to cut a thinner lath than required. The center point or pin support of the feeding roller (L), at either end, and grip of the ratchet wheel against the feed roller or its wheel by the combination of the hand lever (M), rod (n), and arm or lever (o), gives a free action to the roller independent of the frictional bite, and the whole forms a ready and advantageous means for establishing or breaking the frictional bite of the ratchet wheel. Where the work is heavy however, and a permanent gear of the ratchet wheel with the feeding roller is preferred, the same may be adopted, and still the advantages of the arrangement taking in the endless chain and pin feed of the slide (G), and simultaneous feed of the carriage, be, in the main, preserved; but, for light work, I prefer the frictional control to the feeding action of the slide and catches.

What I claim as new and useful herein, and desire to secure by Letters Patent, is—

1. The combination, with the endless chain (E) and driving pin (f) to the reciprocating feed carriage; of the carriage slide (G) set in independent motion at intervals as described; lever (H); and pawl or pawls (I, J) of the feeding ratchet; or their equivalents; for actuation of both the longitudinal and cross feeds, essentially as specified.

2. I also claim the gear of the cross feeding ratchet wheel (K) with the feeding roller (L) by frictional contact, and support or gear of said roller, through center points or end pins, with lever appliances, or their equivalents, at its end or ends, to admit of the free run of the roller independent of its frictional contact with the feeding ratchet wheel, also admitting of the frictional bite of said wheel and roller being estabished, or broken, with facility, without interfering with the motion of the ratchet and gear therewith of the actuating pawl or pawls, substantially as and for the purposes set forth.

In testimony whereof, I have hereunto subscribed my name.

THOS. J. ALEXANDER.

Witnesses:
J. B. ARNOLD,
R. R. ARNOLD.